United States Patent [19]

Toldi

[11] Patent Number: 4,607,613
[45] Date of Patent: Aug. 26, 1986

[54] WOK ADAPTER

[76] Inventor: George Toldi, 2775 Glorietta Cir., Santa Clara, Calif. 95051

[21] Appl. No.: 632,296

[22] Filed: Jul. 19, 1984

[51] Int. Cl.$^4$ .................. A47J 36/34; B65D 25/28; F24C 15/26; F24C 15/34
[52] U.S. Cl. .................. 126/215; 126/214 C; 126/388; 126/390; 126/246; 220/69; 220/94 R; 220/455; 374/162
[58] Field of Search .................. 220/69, 455, 94 R; 126/390, 388, 215, 214 D, 375, 273.5, 214 C, 400, 246; 219/429, 430, 456, 462; 374/162

[56] References Cited

U.S. PATENT DOCUMENTS

| | | | |
|---|---|---|---|
| 929,388 | 7/1909 | Clement | 126/375 X |
| 1,063,609 | 6/1913 | Shaw et al. | 126/273.5 |
| 1,698,926 | 1/1929 | Wentorf et al. | 126/215 |
| 2,315,475 | 3/1943 | Cobb et al. | 220/455 X |
| 3,054,395 | 9/1962 | Torino | 126/375 |
| 3,344,735 | 10/1967 | Kochman | 126/215 X |
| 3,593,702 | 7/1971 | Zigomalas | 220/455 X |
| 3,701,344 | 10/1972 | Walls et al. | 374/162 X |
| 3,736,861 | 6/1973 | Kroyer | 374/162 X |
| 4,313,416 | 2/1982 | Lau | 219/456 X |
| 4,435,638 | 3/1984 | Simon et al. | 219/456 X |
| 4,482,067 | 11/1984 | Saito et al. | 220/69 X |

FOREIGN PATENT DOCUMENTS

| | | | |
|---|---|---|---|
| 694715 | 12/1930 | France | 220/69 |
| 1515731 | 1/1968 | France | 220/69 |
| 2049399 | 12/1980 | United Kingdom | 126/390 |
| 320680 | 1/1972 | U.S.S.R. | 126/215 |

*Primary Examiner*—Allan N. Shoap
*Attorney, Agent, or Firm*—Michael J. Hughes

[57] ABSTRACT

The invention is a unitary solid interface adapter for placement at the bottom of a wok. The adapter is made from a thermally conductive material and has an exterior shape substantially in the nature of a frustum of a cone. The upper surface of the adapter is concave in the shape of a sector of a sphere such that a traditional wok will nest therein with approximately equal contact over the entire interface therebetween. The bottom surface of the adapter is substantially flat for maintaining a solid stable perch on either electrical stove elements or gas range lattice support structures. The bottom of the adapter may be provided with anti-slip protrusions which prevent the adapter from sliding on the top of the range element. The side of the adapter is angled outward in a conical fashion such that the heat generated by a smaller area of element at the bottom surface of the adapter may be delivered to a greater area of the wok surface for maximum usable cooking area. The adapter can be provided with a handle attachment detent such that a detachable handle may be attached thereto for transporting the adapter while it is still hot.

4 Claims, 2 Drawing Figures

WOK ADAPTER

TECHNICAL FIELD

The present invention relates generally to food preparation devices and more specifically to cooking vessels and utensils.

BACKGROUND ART

With the advent of easy travel between far countries, the societies of the world have become more and more cosmopolitan. One area where this is best exemplified is in the proliferation of differernt types of popular foods and methods of food preparation. The modern human being has access to cuisine from myriad cultures and locales. No longer is one restricted to the same sort of food and cooking methods utilized by one's forebearers.

One type of cuisine that has become very widespread and popular is the genre of oriental, and more particularly Chinese, cooking. Even the term "Chinese cooking" is too broad since there are many subgroups within it. However, the food preparation techniques of stir frying and deep fat frying with a minimal amount of oil carry throughout. For these methods of preparation the traditional and appropriate vessel is the broad round metal vessel known as a wok.

There are many advantages to wok cooking. The concave interior (in the shape of a sector of a sphere) of a wok has no sharp corners or nooks and crannies in which food can become trapped. Therefore, it is especially well suited for cooking items evenly. The smooth cooking surface also makes it possible to cook using a minimum amount of fats or oils since the items to be cooked may be moved into the heated oil very easily. A larger usable surface area of oil may be obtained with the same volume of oil in a wok than may be attained in other frying implements such as cylindrical or flat-bottomed pots or deep fat fryers.

Woks are also typically utilized for cooking for very short time periods at high heats. In a typical stir-fry recipe the cooking time is 4 minutes or less. The health benefits of short time cooking with minimal use of fats are substantial. Less fat is absorbed into the food being cooked than with Western methods and consequently the fat intake of the diner is minimized. In addition to the health benefits, the flavor in the food items, particularly in vegetables, is substantially retained by the high temperature sealing of the surfaces. This cauterization seals the flavors and juices inside for maximum concentration.

Typical foods to be cooked in a wok, such as marinated meats and fresh vegetables, contain a significant amount of water and/or aqueous based fluids. There is also frequently some free moisture associated with the foods since they have been recently washed or marinated. When this water and other free moisture encounters the hot oil, the vaporization of the aqueous substances draws energy from the surroundings (under equilibrium principles) and causes a substantial cooling of the oil. With the small quantities of cooking oil typically utilized in Chinese cooking this can result in a very substantial temperature reduction in the cooking oil.

For this reason, Western recipes for Chinese cooking suggest that extremely high smoke-point cooking oils, such as peanut oil, be utilized. The reason for this is that these oils can be heated to nearly 500° F. before beginning to degrade. The object is that if the oil is initially heated to a temperature which is very high, in relation to the necessary minimum frying temperature, then even the cooling caused by evaporating the moisture will not cause the oil to drop below the critical frying and cauterization temperature, approximately 150° C. (~300° F.).

With oils which cannot be heated to such a high temperature, the endothermic reaction of vaporization of the moisture causes the oil temperature to drop below effective cauterization levels and results in less effective sealing of the capillaries in the food. The longer the food is heated at temperatures below the cauterization temperature the more moisture is delivered from the interior of the food item, by capillary action, to the exterior and vaporized away. Thus, the longer the oil is maintained at a temperature below effective cauterization levels the more moisture is lost from the food item and the dryer and less tasty the finished meal. Therefore, it is extremely desirable to maintain minimum frying temperatures at all times or, at least, to minimize the time during which the oil temperature is below optimum levels.

The difficulties with temperature reduction affecting the drying out of the food are not as pronounced in traditional Chinese cooking not in Western cooking, regardless of the type of cooking oil utilized. In traditional Chinese style cooking the problem is avoided since the wok is in direct contact with a high volume heat source which can replenish the heat at a very rapid rate and maintain the oil at a substantial temperature. In Western cooking methods the problem does not arise because the volume of cooking oil utilized is so large that the net cooling effect from the endothermic vaporization of the moisture is widely distributed and has little net effect on the overall temperature of the oil.

The traditional wok is also very useful because it is easily cleaned between courses. The rounded smooth metal surface may be easily wiped out or dumped for cleaning with very little residue. Thus it is possible to cook multi course meals in the same vessel.

One of the main impediments to the use of the wok by modern Western cooks is that it does not adapt well to use on electric and gas ranges. The wok was developed for use in placing it directly on hollowed out sections of coals in the ground and/or on rings with a wide based fire built underneath. However, the cooking surfaces utilized in the United States, particularly, are typically flat for delivering heat to flat bottomed cooking vessels such as frying pans or sauce pans. The spherical surface of the wok does not adapt well to cooking on modern electric and gas ranges. Various methods have been utilized in attempts to overcome this problem.

Some methods have involved modifying the structure of the wok itself. One such method is the production of flat bottomed woks for resting in a stable manner on a flat range tops. This has been done either by making the wok wall a uniform thickness and having both inside and outside have a flat bottom, in which case the resultant utensil is a little more than a high sided frying pan with all its inherent disadvantages, or by building the outside of the wok up only to leave a spherical cooking surface with a flat exterior surface. The disadvantage of the second method is that the weight and mass of the wok are substantially increased. This leads to difficulties both in making the wok unwieldly for dumping cooked food out and other handling and also in substantial heat retention on the cooking surface which limits the efficacy of cleaning the wok between courses. A standard thin walled wok will cool substantially in a very short time after being removed from the heat and is thus easily cleaned whereas a wok with the material built up to form a flat bottom will retain the heat and will be much more difficult to clean.

Another modification to the wok has been the use of elelctric woks wherein the heating elements are arrayed in a partially sherical fashion about the bottom of the wok to provide even heat distribution. These woks are typically quite expensive and also retain the same disadvantages of the built up flat bottomed woks regarding unwieldliness and undue heat retention.

Those who wish to attain the advantage of cooking in a traditional thin walled wok have been forced either to abandon the use of modern ranges or else to utilize some form of interface adapter between the range and the wok. The alternate heating methods are less than desirable since they force the user to abandon the range top, the most commonly used cooking area in the kitchen. Thus, interface adapters have become popular.

The interface adapters that have been used to date have all been in the nature of rings or collars which are adapted to fit on the range element surface and to provide a circular ring upper surface into which the wok bottom nests in a fairly stable fashion. All of the rings and collars which the inventor has observed have been provided with holes for easy grasping and to reduce the total weight of the adapter.

There are three major disadvantages to prior art interface adapters. The first is thay they often lack stability. Electrical range elements are typically spiral elements with spaces between different portions of the element. In this manner, the bottom surface of the adapter ring will typically rest partially on the element and partially on the spans betwen portions of the element. Especially since the shape and size of the electrical elements varies drastically from stove to stove, this can often result in an unstable circumstance. Instability can be a great disadvantage since spillage of cooking oil can lead to kitchen fires and severe burns to the cook. The problem is even more notable in gas ranges which typically have only an open latticework frame to support the cooking vessel with wide spaces between the various elements of the frame. There is a greater danger of instability of the adapter rings on this sort of latticework than even on the electrical elements.

A second disadvantage of prior art adapter rings or collars is that the heat is delivered to the wok in an uneven fashion. Thermal energy is deliverd directly by conduction to the ring portion of the wok where the top of the adapter ring and the wok directly interface. However, the remaining portions of the wok must either be heated by radiative energy or by indirect conduction. Consequently, a hot ring area may develop part-way up the sides of the wok, particularly if the wok is constructed of less than optimal material. This provides for uneven cooking and does not provide the maximum heat to the very bottom of the wok where most of the actual cooking takes place.

A third disadvantage of prior art interface adapter rings and collars is energy inefficiency. A significant amount of thermal energy is carried away from the cooking surface of the wok both by radiation from the ring and by convection through the holes in the ring. Thus the cook is obligated to maintain the heating element at very high heat in order to achieve proper cooking temperatures on the interior of the wok. At least one major distributor (General Electric) has specifically recommended against the use of oriental woks and prior art adapters in conjunction with their stove tops (Stove Top Owners Manual, publication number 49-4523, page 6). The continual use of the high heat involved with prior arts adapters can cause damage to the stove top elements.

Additionally, the prior art interface adapter rings and collars tend to dissipate heat rapidly when the wok is removed for food dispersal and/or cleaning. Therefore, it is necessary to reheat the adapter and the wok again as soon as the wok is replaced on the ring. Substantial energy is wasted in this manner.

Furthermore, since the prior art adapters do not retain any substantial amount of heat they do not provide a high volume heat transferral mechanism to the wok. Therefore, when the cooler food substances and the associated free moisture are delivered to the oil the consequent cooling will lower the temperature of the oil below the cauterization level. Since there is no truly high volume heat source to reheat the oil quickly to the cauterization level this results in dryer and less tasty foods unless a very high smoke-point oil is utilized. Even in these cases the energy utilization is increased since it is necessary to heat the oil to a higher temperature before it is usable. Due to the inefficiency of heat transfer it is necessary to maintain the heating element or flame level at a higher increment to result in effective stir-frying.

None of the prior art attempts have been satisfactory in providing a method by which the traditional oriental wok may be properly utilized with modern Western flat topped cooking elements.

DISCLOSURE OF INVENTION

Accordingly, it is an object of the present invention to provide an interface adapter such that traditional woks may be utilized effectively with range top cooking elements.

It is another object of the present invention to provide an adapter which delivers heat energy evenly to the entire bottom, or cooking, portion of the wok.

It is yet another object of the present invention to provide an extremely stable interface between the electrical heating element and/or gas lattice support structure and the traditional wok.

It is still another object of the present invention to provide a thermal energy "capacitor" which can retain heat and then conductively deliver the thermal energy in a high volume and at a rapid rate to a wok.

It is a still further object of the present invention to provide a simple, efficient and economical device for reproducing the conditions of traditional Chinese cooking while utilizing Western cooking surfaces.

It is a further object of the present invention to provide an energy efficient heat delivery and retention interface for cooking in a wok.

This invention relates to cooking vessels and accessories thereto. The present invention is particularly adapted for utilizing with traditional Chinese style woks and modern Western stove top range elements.

Briefly, the preferred embodiment of the present invention is a unitary solid wok interface adapter. The thermally conducting adapter has an exterior shape substantially in the nature of a frustum of a cone. The upper surface of the adapter is concave in the shape of a sector of a sphere such that a traditional wok will nest therein with approximately equal contact over the entire interface therebetween. The bottom surface of the adapter is substantially flat for maintaining a solid stable perch on either electrical stove elements or gas range lattice support structures. The bottom of the adapter may be provided with anti-slip protrusions which prevent the adapter from sliding on the top of the range element. The side of the adapter is angled outward in a conical fashion such that the heat generated by a smaller area of element at the bottom surface of the adapter may be delivered to a greater area of the wok surface for maximum usable cooking area. The preferred materials for the adapter are highly thermally conductive metals such as copper, aluminum and cast iron. In one preferred embodiment, the adapter is further provided with a handle attachment detent such that a detachable handle may be attached thereto for transporting the adapter while it is still hot.

An advantage of the present invention is that the wok adapter provides an extremely stable interface between a traditional Chinese wok and modern range top cooking elements, whether electrical or gas.

Another advantage of the present invention is that the heat delivered from the adapter to the wok is entirely delivered by conduction to a wide usable surface area of the wok.

A further advantage of the present invention is that the adapter will retain a substantial amount of thermal energy when the wok is removed for food dispersal and/or cleaning.

Yet another advantage of the present invention is that all parts of the cooking surface of the wok are provided with substantially equivalent amounts of thermal energy through the adapter.

Still another advantage of the present invention is that it may be effectively utilized with ordinary cooking oils, that is, high smoke-point oils such as peanut oils are not required.

A still further advantage of the present invention is that it is adapted for delivering a high volume of thermal energy to the cooking surface at a very rapid rate such that a minimal amount of time is required to reheat the oil to effective cauterization temperature after the food material has been placed in the oil.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE OF CARRYING OUT INVENTION

Figure 1:
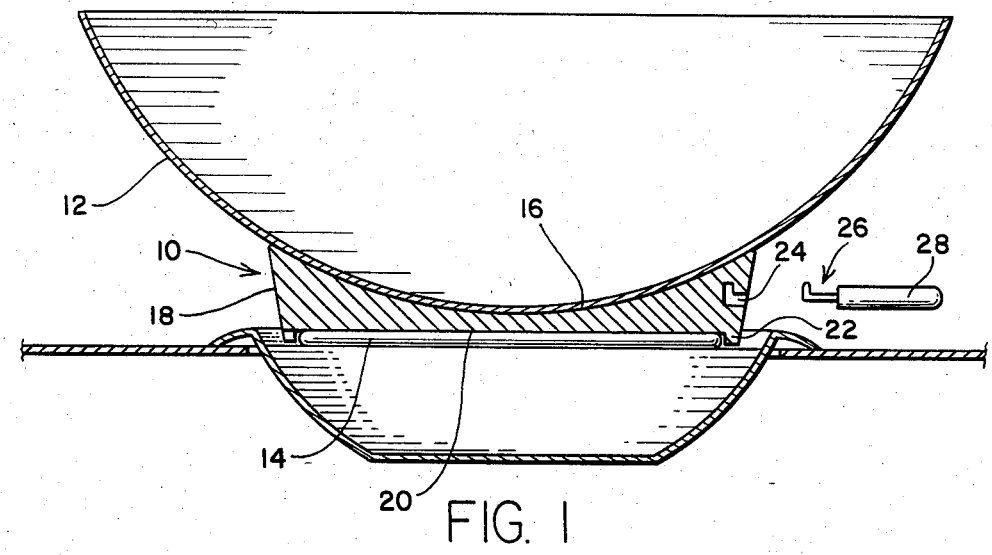
FIG. 1 is a cross sectional view of a wok adapter of the present invention shown as an interface between a traditional wok cooking vessel and a range top electrical element.

The present invention is an interface adapter directed at providing an appropriate, stable, energy efficient interface between a modern Western style stove-top range, be it gas or electric, and a traditional Chinese wok. The preferred embodiment of the invention is illustrated in the drawing and described herein.

Referring now to FIG. 1, the wok interface adapter of the present invention is illustrated in a cross-sectional view and is shown in actual use, that is mounted upon an electrical range top burner and having a wok nested therein. The wok interface adapter of the present invention is referred to by the general reference character 10. In this illustration, the interface adapter 10 is shown as holding a Chinese wok 12 and as being mounted upon an electric range element 14. The interface adapter 10 is constructed of a material, usually a metal, which has high structural strength and high heat conductive and retentive properties.

The wok interface adapter 10 is constructed to have an exterior shape generally in the nature of a frustum of a cone. The upper surface of the interface adapter 10 is a concave surface 16 which is in the general shape of a sector of a sphere such that it mates readily with the bottom surface of the wok 12. The concave surface 16 is selected such that the wok 12 will rest therein in a stable manner with substantially even contact between the adapter 10 and the wok 12 over the entire interface surface. The concave surface 16 is selected to be smooth. It is also adapted such that maximum conductive heat transfer is provided through the concave surface 16 to the surface of the wok 12.

The adapter 10 has a circular horizontal cross section and is provided with a sloping conical side 18 which extends entirely about the adapter 10. A flat bottom surface 20 is provided for resting on the element 14 or similar support structure. Conical side 18 is angled outward such that the adapter 10 is wider at the edges of the top of the conical surface 16 than it is at the edges of the bottom surface 20. This frustular shape is selected such that a wider area of the surface of the wok 12 may be supported by the adapter 10 for a given size of electrical element 14 than if cylindrical shape were utilized. The conical shape also provides for even heat and mass distribution with the center of gravity of the adapter 10 being situated directly over the center of the burner. The shape is also desirable for even thermal energy conduction to the various portions of the top surface 16.

The bottom surface 20 is selected to be flat throughout its center portion such that it will rest evenly either upon a spiral electrical range element 14, such as is shown in FIG. 1, or upon a lattice type of support ordinarily utilized on gas ranges. At selected positions around the circumference of the bottom surface 20 are provided a plurality of anti-slip protrusions 22. The anti-slip protrusions 22 are adapted to engage with the circumferential edges of the range element 14 and prevent the adapter 10 from moving laterally with respect thereto. The number and positioning of the anti-slip protrusions 22 is determined by the specific construction of the embodiment for a given sized range element 14. In the preferred embodiment the number of protrusions 22 is selected to be three. The protrusions 22 are equally spaced about the circumference. This has been found to be sufficient for ordinary electrical burner elements 14.

An optional, but very useful, modification made to the preferred embodiment of the wok adapter 10 is a method for attaching a handle thereto such that it may be moved readily from one burner to another or to any other surface while it is still hot. One method of accomplishing this is shown in FIG. 1. In this illustration of the wok adapter 10 it is seen that a handle attachment detent 24 is provided in one side of the wok adapter 10. The detent is in the nature of an aperture formed in side 18 sufficient to receive a detachable handle 26. The handle 26 is adapted for fitting into detent 24 to provide a secure attachment. The handle 26 is provided with an insulated grip portion 28 such that it may be easily grasped by the user without the necessity of additional thermal protection for the hand.

In addition to the method shown various methods may be utilized to attach permanent and/or detachable handles to the wok adapter 10. These include screw-on type handle attachments and permanently attached handles. Furthermore, since the best place for storing the adapter 10, at least until it has thoroughly cooled, is ordinarily the top of the range, it is not absolutely necessary that any handle mechanism be utilized.

Figure 2:
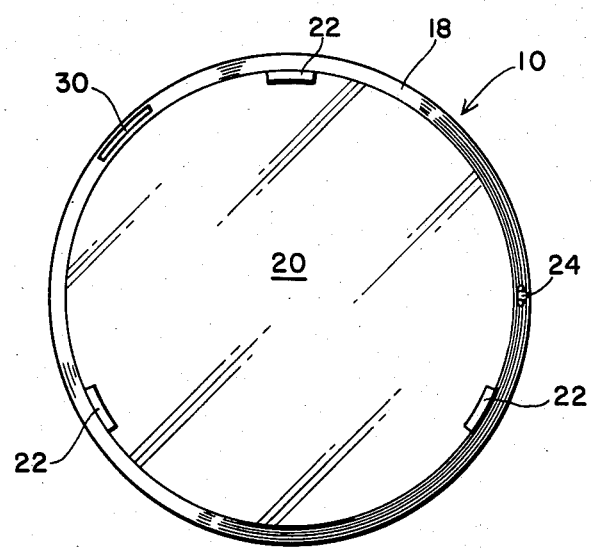
FIG. 2 is a bottom plan view of the wok interface adapter of FIG. 1.

Referring now to FIG. 2 the wok interface adapter 10 of the present invention is shown in a bottom plan view. This illustration shows the position of the anti-slip protrusions 22 and further illustrates the nature of the conically inclined side 18. The handle attachment detent 24 is shown as being situated within the inclined side 18 at one position on the adapter 10.

Another useful option which may be added to the adapter 10 is a temperature indicator 30. This indicator 30, shown as positioned along the conical side 18, provides a manner in which the user can determine whether the adapter 10 has reached the sufficient heat for application of the wok 12. A typical temperature indicator 30 would be in the nature of a bi-metallic thermometer which would turn an appropriate color upon reaching full heat, typically approximately 177° C. (350° F.). A preferred bi-metallic thermometer temperature indicator has a temperature range of 93° to 371° C. (200° to 700° F.).

Another manner in which the usefulness of the wok interface adapter 10 may be increased is by providing the conical side 18 with an antiradiative coating. This is not a necessary embellishment in most cases but can be implemented to maximize performance. A preferred coating is black oxide for iron and black anodizing for aluminum. The antiradiative coating provides a method for restricting the amount of heat radiated away from the surface of the adapter 10 in use. This results in improved heat retention in the adapter 10 such that less energy is lost to the environment and a greater amount is directed to the surface of the wok 12 for cooking purposes. If the material of the adapter 10 is cast it will typically have an irregular, inherently non-radiative surface. In this case the coating has only a very minimal effect. However, if the adapter 10 is formed of a milled or polished material then the addition of a coating has a definite positive effect.

The wok interface adapter 10 is constructed of an excellent heat conductor material. One preferred material is cast iron, another is high density aluminum, and a third is metallic copper. Each of these materials is selected for its ability to provide stable support for the wok 12 and excellent conductive heat transferrence from the element 14 to the wok 12. The selection of materials for a given embodiment of the adapter 10 will be determined by cost, appearance and weight requirements. A summary of the heat transfer capabilities and densities of these three materials, olive oil and air, as comparison is shown below in Table 1.

TABLE 1

| Material | Density | Specific Heat | Heat Conductivity Cal/cm$^2$/ cm/sec/°C. |
|---|---|---|---|
| Iron | 7.86 | 0.106 Cal/gram | 0.083 |
| Copper | 8.92 | 0.092 at 25° C. | 0.941 |
| Aluminum | 2.702 | 0.215 | 0.530 |
| Olive Oil | ~0.9 | ~0.40 | 0.108 |

TABLE 1-continued

| Material | Density | Specific Heat | Heat Conductivity Cal/cm$^2$/ cm/sec/°C. |
|---|---|---|---|
| Air (at STP) | $1.18 \times 10^{-4}$ | ~0.24 | $6.0 \times 10^{-5}$ |

The specifications for a typical 2,000 watt electrical range element indicate that only approximately 300 Calories of heat are delivered per minute. This is insufficient to heat a wok effectively using prior art adapting devices. The devices are such that they cannot conduct and/or retain sufficient energy to, for example, rapidly heat the oil back to an effective cauterizing temperature after meat or vegetables are placed in the oil. However, utilizing the wok interface adapter 10 of the present invention, the problem is much diminished since the adapter 10 functions as a virtual thermal energy "capacitor" in that it stores thermal energy. This energy can then be rapidly conducted to the wok, when the equilibrium is disturbed by a cooling action, at a rate which is much higher than could be achieved with prior art adapters.

The wok interface adapter of the present invention may be constructed in various sizes to adapt to various types of elements. For a typical 20 cm (8 inch) diameter 2,000 watt electrical element, the bottom surface 20 will be adapted to have a diameter slightly larger than that of the element, the conical side 18 will be angled outward at an angle of 10°, the diameter of the adapter 10 at the top of the conical sides 18 will be approximately 22 cm (8.6 in) and the concave surface 16 will have a curvature radius of about 25 cm (10 in). The typical preferred embodiment will be constructed of cast iron and weigh approximately 4.5 kg (9 lbs) or of aluminum and weigh about 1.5 kg (3 lbs). Three evenly circumferencially spaced anti-slip protrusions 22 will be provided at the edge of the bottom surface 20.

Variations in dimensions and materials from the preferred embodiment may be readily accomplished to serve specific requirements of the manufacturer and/or user. Curvature of the concave surface 16 may be modified to receive different sizes of woks 12 than the 40 cm (16 inch) wok which has been the basis for the prior discussion. Various other aspects of the invention may also be easily modified.

Those skilled in the art will readily observe that numerous modifications and alterations of the device may be made while retaining the teachings of the invention. Accordingly, the above disclosure is not intended as limiting. The appended claims are therefore to be interpreted as encompassing the entire spirit and scope of the invention.

INDUSTRIAL APPLICABILITY

The wok interface adapters of the present invention are particularly adapted for utilization with traditional Chinese woks on modern Western style flat-top range elements. They may be utilized with either electrical spiral elements, flat-topped ceramic elements or gas burner elements. The adapters are provided with a flat bottom surface and anti-slip protrusions such that a stable interface may be accomplished with any of the above type of range-top heating elements.

The adapters may also be utilized with any of a variety of woks. The typical 40 cm (16 inch) wok utilized for Chinese cooking will nest readily into the concave surface formed on the upper portion of the interface adapter 10. The concave surface 16 is constructed such that the bottom surface of the wok 12 will rest readily therein with substantially even conductive contact between the adapter and the wok over the entire concave surface of the adapter.

In ordinary use the wok interface adapter 10 of the present invention is placed upon a range-top heating element 14 and the element is actuated. Thermal energy is built up in the adapter by the heating caused by the element. When the adapter has reached an appropriate temperature the wok is placed thereon in a stable fashion. The typical wok will heat up to cooking temperature very rapidly. The items to be cooked are then placed within the wok and the cooking process is accomplished. When the cooking is accomplished the entire wok may be readily removed from the adapter for dispersal of the cooked food and cleaning of the wok vessel. During this time period the wok itself will cool rapidly while the adapter will retain the thermal energy, much in the same manner that a fly-wheel retains kinetic energy or a capacitor retains electrical energy. When the food dispersal and/or cleaning processes are complete the wok may be replaced on the adapter and will be reheated very rapidly. This results in energy savings.

Deluxe models of the wok interface adapter may include a handle attachment detent for attaching a detachable handle for moving the adapter from burner to burner or to another surface while the adapter is still hot. The adapter may also include various other modifications. One useful option is the addition of a temperature indicator on the exterior surface of the adapter to allow the user to observe when the adapter has reached a heat sufficient for placing the wok thereon. At this point the wok may be placed on the adapter and the amount of heat required from the element is reduced. A further optional improvement is the provision of anti-radiative coating for the adapter. The anti-radiative coating prevents thermal energy from being radiated to the environment during use and directs the energy by conduction to the wok rather than to the air.

When the wok adapter of the present invention is utilized with a gas burner rather than an electrical element it is possible to adjust the gas burner such that the flame is delivered only to the bottom surface of the adapter. This results in a much lower usage of heat than in trying to heat a wider wok surface area. The excellent conductive energy transfer capabilities of the adapter provide the heat evenly to the wok surface even though the delivery from the gas burner is typically in the nature of an uneven ring of heat.

For all of the above reasons it is expected that the wok adapter of the present invention will have widespread industrial and home applicability. Anyone wishing to utilize traditional Chinese wok cooking on modern Western flat-top ranges will find that the invention dramatically increases stability, evenness of heating and energy efficiency. Therefore, it is expected that the commercial utility of the present invention will be very widespread.

I claim:

1. A wok interface adapter for supporting a wok cooking vessel of the type comprising a curvilinear metallic shell, and further for conductively transferring thermal energy from a range top cooking element to the wok while providing a thermal energy reservoir therefor, comprising:

an adapter solid formed in the general shape of the frustum of a cone, including an upper wok receiving surface adapted to have a shape complementary to the lower central exterior surface of the wok, such that the wok rests thereon in a stable manner, a planar lower surface adapted to rest in a stable manner upon the range top cooking element, an inclined circumferential conical side surface having an increasing diameter from the lower surface to the top surface and having a handle attachment detent formed therein at a location intermediate the upper surface and the lower surface, and a solid body portion enclosed by the upper surface, the lower surface and the circumferential surface, the body portion being thermally conductive in nature so as to facilitate thermal energy transfer from the range top cooking element to the wok while having the property of partially retaining thermal energy therein when the wok is removed from the upper surface; and a handle element adapted to detachably mate with said handle attachment detent such that the adapter solid may be transported thereby.

2. The wok interface adapter of claim 1 and further including:

temperature indicating means attached to the circumferential side.

3. The wok interface adapter of claim 1, wherein, said handle attachment detent is in the form of a vertically arrayed cylindrical tube formed in the body portion, the lower portion of said tube being accessible from the circumferential side; and the handle element includes a tip adapted to fit into said tube.

4. The wok interface adapter of claim 1, and further including a plurality of anti-slip protrusions formed on the lower surface near the junction of the lower surface and the circumferential surface, said protrusions being adapted to abut against the sides of the range top cooking element to inhibit lateral movement of the adapter with respect to the cooking element.

* * * * *